J. KAUFFMAN.
VEHICLE-SPRING.

No. 178,934. Patented June 20, 1876.

Witnesses:
Chas. M. Peck
Wm. Ritchie

Inventor:
Jacob Kauffman
by his Atty's.
Peck & Co.

UNITED STATES PATENT OFFICE.

JACOB KAUFFMAN, OF MIAMISBURG, OHIO.

IMPROVEMENT IN VEHICLE-SPRINGS.

Specification forming part of Letters Patent No. 178,934, dated June 20, 1876; application filed May 6, 1876.

*To all whom it may concern:*

Be it known that I, JACOB KAUFFMAN, of Miamisburg, in the county of Montgomery and State of Ohio, have invented certain new and useful Improvements in Side Springs for Vehicles; and I do hereby declare the following to be a full, clear, and exact description of the same.

This invention relates to that class of vehicles which employ semi-elliptical side springs to couple the axle-springs; and my improvement consists in the formation of the coupling which unites side springs to the axle-springs, as will be herewith described, and the invention distinctly pointed out in the claim.

To enable others skilled in the art to which my invention appertains to make and use the same, I would thus proceed to describe it, referring to the accompanying drawings, in which—

Figure 1:
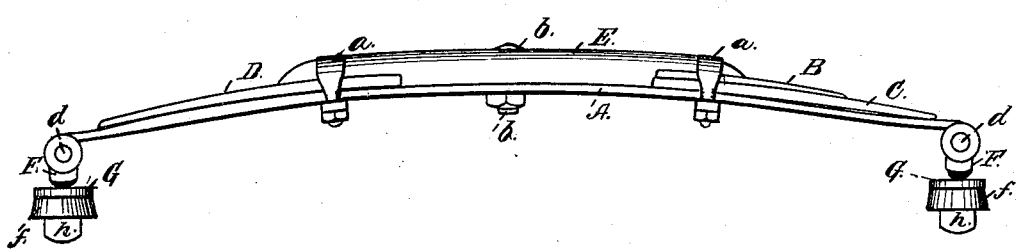
Figure 2:
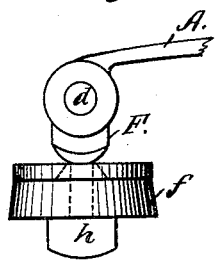
Figure 3:
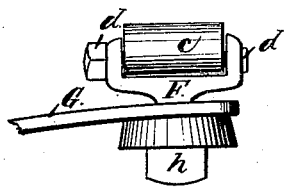

Figure 1 is a side elevation of my improved side-spring coupling. Fig. 2 is an enlarged side elevation of the coupling. Fig. 3 is an end elevation of Fig. 2.

Corresponding letters of reference indicate like parts in all the figures.

A represents the ordinary bottom leaf of a semi-elliptical spring, provided at each end with knuckles. At the rear, two overlapping leaves, B and C, are placed upon the bottom leaf A, and extend forward about one-third the length of the spring. A single leaf, D, of about the same length as the leaf C, lies upon the leaf A at the forward end. These leaves are connected and held firmly in place by a wooden bar, E, which, resting upon the bottom leaf, overlaps the short leaves, as seen, and is connected to them by clips $a$, one at each end, and a bolt, $b$, passed through the center of the leaf A and the bar E. By the use of this wooden bar and the short leaves, greater strength with the same amount of elasticity is obtained than if the upper leaves were extended across in the ordinary manner.

I have described the above as a good form of side spring, but I am aware that it is old, and do not claim it.

F is the coupling-bolt, whose top forms the pivotal bearing, in which the knuckle $c$ works, held by the pin $d$. This bolt passes through an orifice in the end of the axle-spring G, which orifice is countersunk from the under side, as seen by dotted lines in Fig. 2, so that the bolt is allowed a limited play in any direction. A rubber disk, $f$, is fitted upon the bolt so as to bear against the under side of the spring G, and a nut, $h$, screwed upon the end of the bolt, presses the rubber disk and holds it in place. This disk serves as a spring, and prevents any injury from side or end strain upon the side springs, and allows them play limited by the countersunk orifices in the axle-springs.

Having thus fully described my invention, what I claim as new, and desire to secure by Letters Patent, is—

The herein-described coupling for the side and end springs of vehicles, composed of the bearing-bolt F, constructed as described, and arranged in the countersunk orifice in the spring G, the rubber disk $f$, and nut $h$, substantially as and for the purpose specified.

Witness my hand this 27th day of March, A. D. 1876.

JACOB KAUFFMAN.

Witnesses:
CHAS. M. PECK,
PATRICK H. GUNCKEL.